US010320872B2

(12) United States Patent
Lee et al.

(10) Patent No.: US 10,320,872 B2
(45) Date of Patent: Jun. 11, 2019

(54) METHOD AND APPARATUS FOR TRANSMITTING AND RECEIVING MEDIA SEGMENTS USING ADAPTIVE STREAMING

(71) Applicant: Samsung Electronics Co., Ltd., Gyeonggi-do (KR)

(72) Inventors: Hyungho Lee, Seoul (KR); Jicheol Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 14/440,038

(22) PCT Filed: Oct. 31, 2013

(86) PCT No.: PCT/KR2013/009759
§ 371 (c)(1),
(2) Date: Apr. 30, 2015

(87) PCT Pub. No.: WO2014/069905
PCT Pub. Date: May 8, 2014

(65) Prior Publication Data
US 2015/0295976 A1    Oct. 15, 2015

(30) Foreign Application Priority Data

Oct. 31, 2012 (KR) .................. 10-2012-0122011

(51) Int. Cl.
*G06F 15/16* (2006.01)
*H04L 29/06* (2006.01)
*H04L 29/08* (2006.01)

(52) U.S. Cl.
CPC ........ *H04L 65/602* (2013.01); *H04L 65/4084* (2013.01); *H04L 67/02* (2013.01)

(58) Field of Classification Search
CPC ... H04L 65/4084; H04L 67/02; H04L 65/602; H04L 29/06; H04L 29/08
See application file for complete search history.

(56) References Cited

U.S. PATENT DOCUMENTS

| 8,510,375 B2 | 8/2013 | Bouazizi |
| 2011/0035507 A1 | 2/2011 | Brueck et al. |

(Continued)

FOREIGN PATENT DOCUMENTS

| KR | 10-2008-0108568 | 12/2008 |
| KR | 10-2012-0038367 | 4/2012 |

(Continued)

OTHER PUBLICATIONS

International Search Report dated Feb. 7, 2014 in connection with International Patent Application No. PCT/KR2013/009759, 7 pages.

(Continued)

*Primary Examiner* — Cheikh T Ndiaye

(57) ABSTRACT

Provided are a method and apparatus for transmitting and receiving media. A method of transmitting and receiving media segments for a base station may include: receiving a segment request message from a user equipment; checking whether the segment request message contains a segment selection delegation indicator through analysis of the segment request message; obtaining, when the segment request message contains a segment selection delegation indicator, play position information from the segment request message; selecting one of two or more segments corresponding to the play position information; and receiving the selected segment from an external server and delivering the received segment to the user equipment. Embodiments of the present invention enable efficient adaptive streaming.

12 Claims, 12 Drawing Sheets

(56) References Cited

U.S. PATENT DOCUMENTS

| | | | |
|---|---|---|---|
| 2011/0082924 A1 | 4/2011 | Gopalakrishnan | |
| 2011/0138431 A1 | 6/2011 | Cedervall et al. | |
| 2012/0110120 A1* | 5/2012 | Willig | H04L 65/1016 709/217 |
| 2012/0222075 A1* | 8/2012 | Liu | H04N 7/17336 725/88 |
| 2012/0259957 A1 | 10/2012 | Keum et al. | |
| 2013/0007814 A1* | 1/2013 | Cherian | H04L 65/605 725/62 |
| 2013/0247118 A1* | 9/2013 | Oyman | H04L 12/2854 725/109 |
| 2014/0025830 A1* | 1/2014 | Grinshpun | H04N 21/2662 709/227 |
| 2014/0140253 A1* | 5/2014 | Lohmar | H04L 65/4084 370/311 |

FOREIGN PATENT DOCUMENTS

| | | |
|---|---|---|
| KR | 10-2012-0103698 A | 9/2012 |
| KR | 10-2012-0114016 A | 10/2012 |

OTHER PUBLICATIONS

Written Opinion of International Searching Authority dated Feb. 7, 2014 in connection with International Patent Application No. PCT/KR2013/009759, 4 pages.

Thomas Stockhammer, "Dynamic Adaptive Streaming Over HTTP—Design Principles and Standards", In Proceedings of the Second Annual ACm Conference on Multimedia Systems (MMSys11), ACM, New York, New York, 2011, 3 pages.

Office Action dated Mar. 13, 2019 in connection with Korean Patent Application No. 10-2012-0122011, 10 pages.

\* cited by examiner (a)

| selection delegation indicator 0~5 second interval <URL> (700) | selection delegation indicator 5~10 second interval <URL> (705) |
|---|---|
| 500Kb 0~5 second interval segment<URL> (710) | 500Kb 5~10 second interval segment <URL> (720) |
| 100Kb 0~5 second interval segment <URL> (730) | 100Kb 5~10 second interval segment <URL> (740) |

METHOD AND APPARATUS FOR TRANSMITTING AND RECEIVING MEDIA SEGMENTS USING ADAPTIVE STREAMING

CROSS-REFERENCE TO RELATED APPLICATION(S)

The present application claims priority under 35 U.S.C. § 365 to International Patent Application No. PCT/KR2013/009759 filed Oct. 31, 2013, entitled "METHOD AND APPARATUS FOR TRANSMITTING AND RECEIVING MEDIA SEGMENTS USING ADAPTIVE STREAMING", and, through International Patent Application No. PCT/KR2013/009759, to Korean Application No. 10-2012-0122011 filed Oct. 31, 2012, each of which are incorporated herein by reference into the present disclosure as if fully set forth herein.

TECHNICAL FIELD

The present invention relates to a method and apparatus for providing media services in a mobile network environment and, more particularly, to a method and apparatus for transmitting and receiving media segments using adaptive streaming.

BACKGROUND ART

With rapid technical advancements in recent years, wireless communication technologies have been utilized for increasingly diversified purposes. Utilization of media streaming services including video and/or audio, in particular, through mobile communication devices has increased. According to communication industries, it is expected that in the near future the mobile data traffic will grow explosively and the mobile video traffic will account for 70% of the total amount of the mobile data. Owing to explosive growth of mobile video traffic, users may experience network congestion.

Hence, a scheme is needed that can effectively deliver video/audio content through a mobile network. According to statistics of the video sharing site YouTube, the top 10 percent of popular video content accounts for nearly 80 percent of all video content traffic. Rather than delivering all video content at similar quality levels, delivering more popular video content at a higher quality level may effectively enhance user satisfaction.

HyperText Transfer Protocol (HTTP) Adaptive Streaming (HAS) has been introduced to deliver video traffic in an effective way. Examples of HAS implementation may include 3GPP (3rd Generation Partnership Project) 3GP-DASH (Progressive Download and Dynamic Adaptive Streaming over HTTP), Apple HTTP Live Streaming, and Microsoft Smooth Streaming.

FIG. 1 illustrates the architecture of a 3GP-DASH system serving as a HAS system. Here, although 3GP-DASH is used for illustration, similar approaches may also be applied to other HAS services.

Features of HAS may be described as follows.

1. Video content is divided into segments or chunks as units for transmission.
2. The HAS server maintains sets of video segments forming presentations, where different versions may be created for a video segment according to, for example, resolution.
3. A Uniform Resource Locator (URL) is assigned to each video segment. A terminal or client may access a desired video segment using URL and HTTP.
4. The HAS server maintains a metadata file containing information regarding the presentation of a source video, segment durations and segment URLs, and provides the metadata file to the client upon service initiation.
5. The client may select a video segment using a metadata file and request the selected video segment via a URL assigned to the video segment.

Referring to FIG. 1, the HAS server is implemented as an HTTP server 100. The HTTP server 100 maintains a Media Presentation Description (MPD) 110 and segments of a source video. The MPD 110 is a type of metadata described above. 3GP-DASH utilizes MPD as a metadata file format. The HTTP server 100 provides the MPD 110 to a DASH client 130. Later, when a request for a video segment is received from the DASH client 130 via HTTP, the HTTP server 100 provides the requested segment to the DASH client 130.

The DASH client 130 may include control heuristics 140, an MPD parser 150, a segment parser 160, a media player 170, and an HTTP client 180. The control heuristics 140 may control the overall operation of the DASH client 130. The MPD parser 150 may parse and analyze an MPD received from the HTTP server 100 and provide necessary information to the other components. In response to a request from the control heuristics 140 or other component, the HTTP client 180 may send a request for a segment as an HTTP request to the HTTP server 100. The HTTP client 180 may receive a video segment as a reply to the request from the HTTP server 100 and forward the received video segment to the segment parser 160. The segment parser 160 may parse the received segment and forward the parsed segment to the media player 170. The media player 170 may provide a control interface to the user, and play back the video segment received from the segment parser 160.

Two main advantages of HAS may be described as follows.

1. The streaming bitrate can be adjusted dynamically according to variations of network throughput.
2. Video streaming can be seamlessly provided to the user at the highest quality available.

FIG. 2 illustrates bitrate variations with time when HAS is used. Part (a) of FIG. 2 depicts bitrates of segments stored in the HTTP server 100 (i.e. HAS server). The HAS server maintains segments with first, second and third bitrates for corresponding time intervals.

Part (b) of FIG. 2 depicts variations in requested chunks or segments and TCP throughput. At the first time interval, the DASH client 130 (i.e. HAS client) may request a segment of the first bitrate. The HAS client may measure TCP throughput that is sufficient for a segment of the second bitrate at the first time interval; and the HAS client may request a segment of the second bitrate at the second time interval. The HAS client may measure TCP throughput that is sufficient for a segment of the third bitrate at the second time interval; and the HAS client may request a segment of the third bitrate at the third time interval. The HAS client may measure TCP throughput that is sufficient for a segment of the second bitrate but insufficient for the third bitrate at the third time interval; and the HAS client may request a segment of the second bitrate at the fourth time interval. Thereafter, while TCP throughput is sustained, the HAS client may request and process segments of the second bitrate and present the processed segments to the user.

Part (c) of FIG. 2 depicts variations in requested segments. As described above in connection with part (c) of FIG. 2, a first-bitrate segment is requested at the first time interval, and a second-bitrate segment is requested at the second time interval. A third-bitrate segment is requested at the third time interval, and a second-bitrate segment is requested at the fourth time interval and at the fifth time interval.

According to the HAS system described above, the HAS client utilizes the total available bandwidth as a TCP throughput estimation. The HAS client selects a presentation such as resolution and/or bitrate for the next segment on the basis of estimated TCP throughput. However, the HAS client cannot be accurately aware of network conditions of base stations or other network entities. Hence, the HAS client is unable to accurately measure the available bandwidth, causing the following problems.

1. Congestion: HAS clients requesting a bitrate higher than the bottleneck throughput may cause congestion.

2. Unfairness: when a HAS client selects a high bitrate and another client selects a low bitrate, the clients tend to maintain the selection unless the bottleneck bitrate is reached, causing unfairness.

3. Under-utilization: HAS clients operating in a conservative manner to avoid congestion may request segments of a bitrate lower than measured throughput, resulting in a poor utilization ratio below the bottleneck throughput.

In addition, as the HAS system operates in an end-to-end (e2e), the both ends cannot exert influence on other traffic passing the base station.

As the HAS client selects a bitrate and reports this to the HAS server, the HAS system may be slow to adapt to network changes.

DISCLOSURE OF INVENTION

Technical Problem

The present invention has been made in view of the above problems. Accordingly, an aspect of the present invention is to provide to a method and apparatus that can transmit and receive media segments so as to effectively provide streaming services.

Solution to Problem

In accordance with an aspect of the present invention, a method of transmitting and receiving media segments for a base station is provided. The method may include: receiving a segment request message from a user equipment; checking whether the segment request message contains a segment selection delegation indicator through analysis of the segment request message; obtaining, when the segment request message contains a segment selection delegation indicator, play position information from the segment request message; selecting one of two or more segments corresponding to the play position information; and receiving the selected segment from an external server and delivering the received segment to the user equipment.

In accordance with another aspect of the present invention, a base station capable of transmitting and receiving media segments is provided. The base station may include: a communication unit to receive a segment request message from a user equipment; and a control unit to perform a process of checking whether the segment request message contains a segment selection delegation indicator through analysis of the segment request message, obtaining, when the segment request message contains a segment selection delegation indicator, play position information from the segment request message, and selecting one of two or more segments corresponding to the play position information. The communication unit may receive the selected segment from an external server and delivers the received segment to the user equipment.

In accordance with another aspect of the present invention, a method of receiving media for a user equipment is provided. The method may include: receiving metadata containing the format of a segment selection delegation indicator; sending, when the user equipment is configured to delegate segment selection to a base station, a segment request message containing the segment selection delegation indicator to the base station; and outputting, when a segment is received from the base station, media corresponding to the received segment.

In accordance with another aspect of the present invention, a user equipment capable of receiving media apparatus is provided. The user equipment may include: a communication unit to receive metadata containing the format of a segment selection delegation indicator, and to send, when the user equipment is configured to delegate segment selection to a base station, a segment request message containing the segment selection delegation indicator to the base station; and a control unit to control an operation to output, when a segment is received from the base station, media corresponding to the received segment.

Advantageous Effects of Invention

In a feature of the present invention, it is possible to provide a method and apparatus that can deliver streaming services in an efficient manner.

BRIEF DESCRIPTION OF DRAWINGS

FIG. 7 illustrates a composition of metadata according to an embodiment of the present invention.

MODE FOR THE INVENTION

The features and advantages of the present invention will be more apparent from the following detailed description taken in conjunction with the accompanying drawings. The following description is provided to assist in a comprehensive understanding of various embodiments of the present invention as defined by the claims and their equivalents. It includes various specific details to assist in that understanding but these are to be regarded as merely exemplary. The same reference symbols are used throughout the drawings to refer to the same or like parts.

Hereinafter, a method and apparatus for transmitting and receiving media segments are described as embodiments of the present invention with reference to the drawings.

Figure 3:
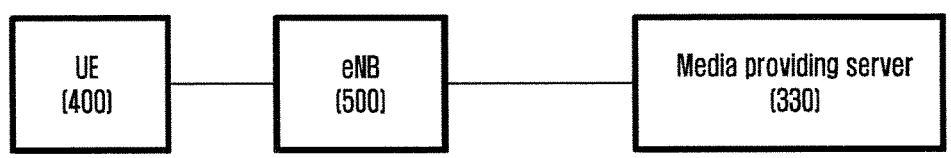
FIG. 3 shows a configuration of a HAS system according to an embodiment of the present invention.

FIG. 3 shows a configuration of a HAS system according to an embodiment of the present invention.

Figure 1:
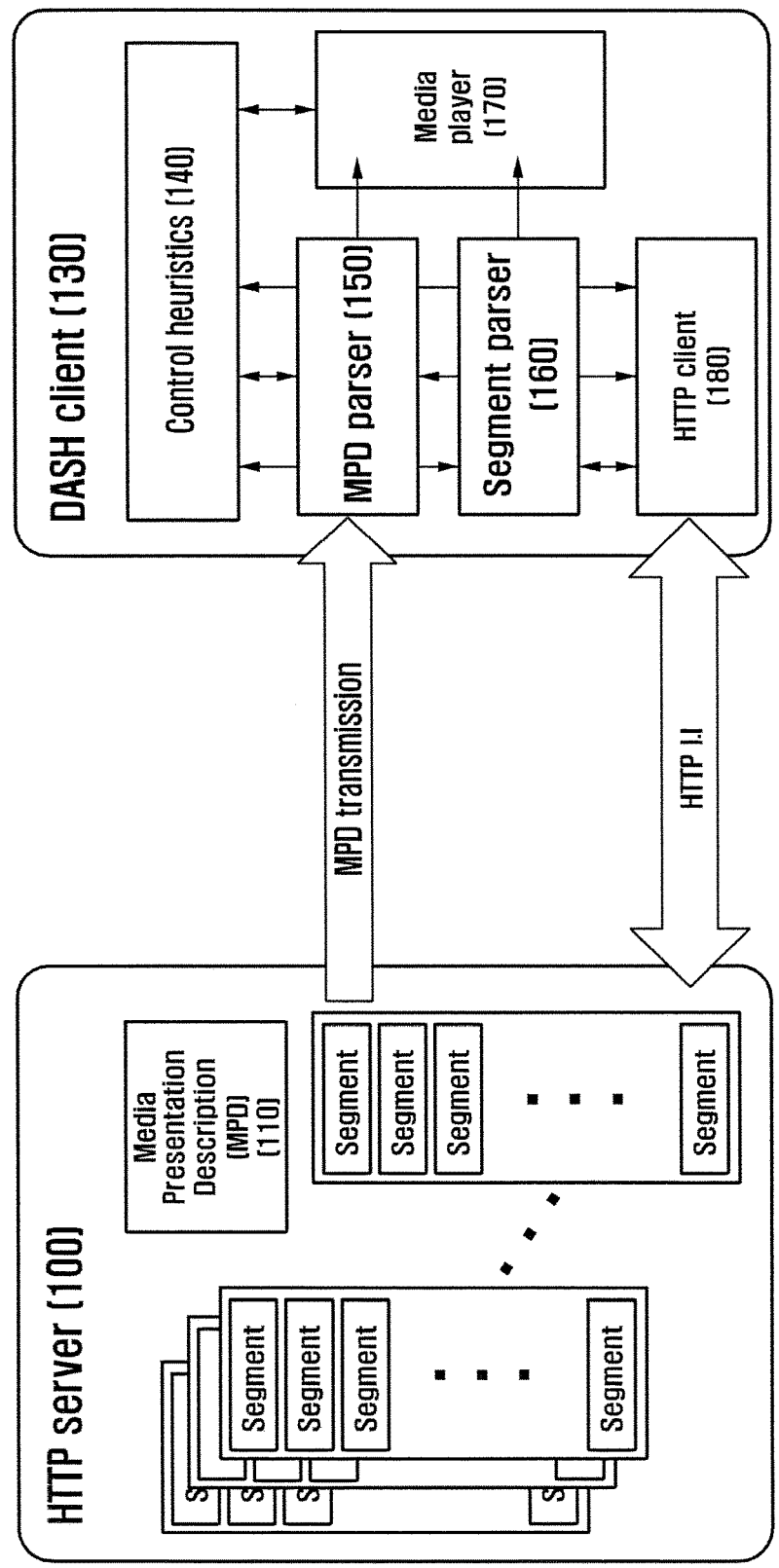
FIG. 1 illustrates the architecture of a 3GP-DASH system serving as a HAS system.
Figure 2:
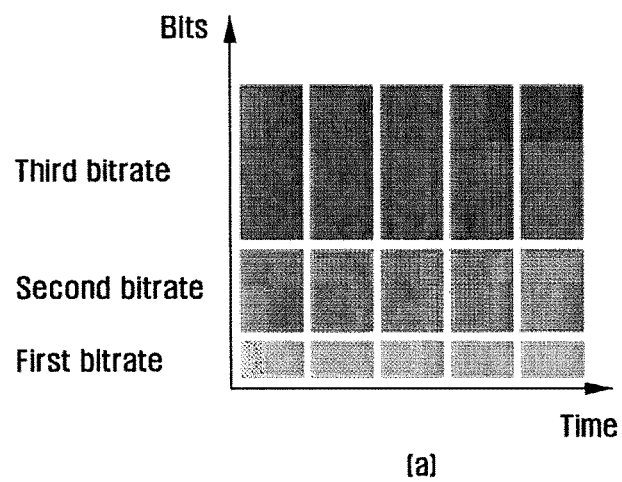
FIG. 2 illustrates bitrate variations with time when HAS is used.
Figure 2:
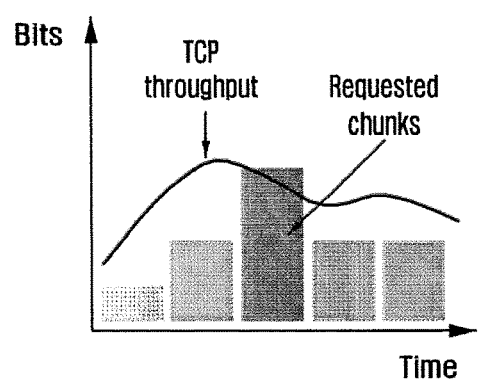
Figure 2:
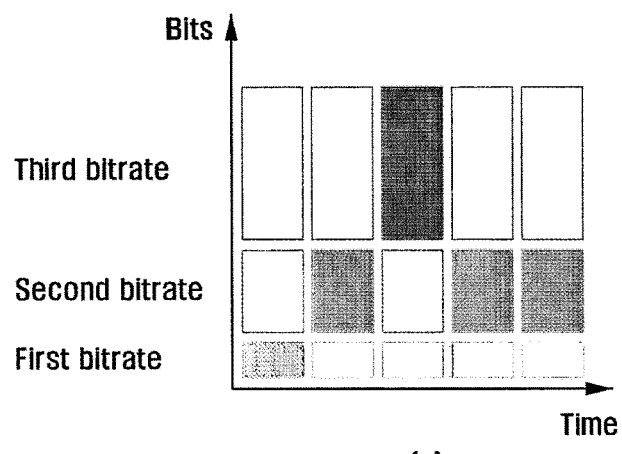

Referring to FIG. 3, the HAS system according to an embodiment of the present invention may include a user equipment (UE or terminal) 400, an evolved Node B (eNB or base station) 500, and a media providing server 330. The media providing server 330 acts as a typical HAS server. As the operation and configuration of the media providing server 330 are similar to or identical to those of the HTTP server 100 described in FIG. 2, a detailed description thereof is omitted.

Figure 4:
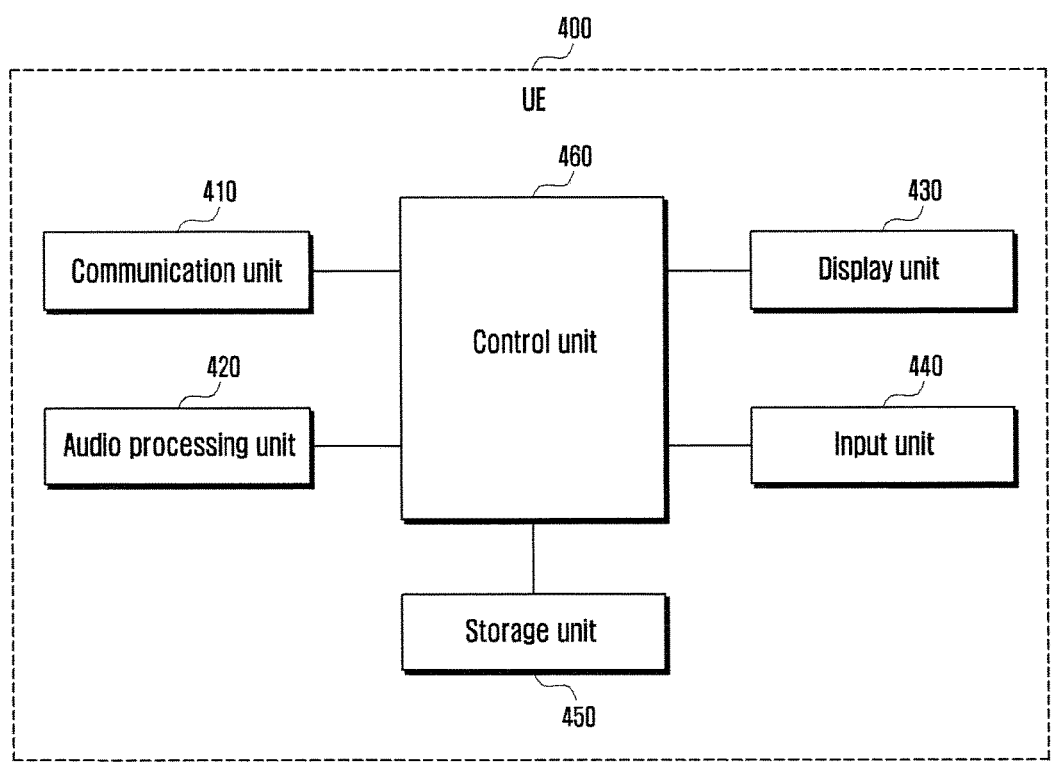
FIG. 4 is a block diagram of a user equipment 400 according to an embodiment of the present invention.

FIG. 4 is a block diagram of the user equipment 400 according to an embodiment of the present invention. Individual components of the user equipment 400 may perform operations needed for normal operation of a mobile communication terminal. However, the following description is focused on operations related to HAS services of the present invention.

Referring to FIG. 4, the UE 400 may include a communication unit 410, an audio processing unit 420, a display unit 430, an input unit 440, a storage unit 450, and a control unit 460. The control unit 460 may control the UE 400 to provide media content via HAS. The communication unit 410 may send a segment request to the eNB 500 and the media providing server 330, and receive a media segment from the eNB 500 and the media providing server 330 and forward the media segment to the control unit 460. The communication unit 410 may also receive an MPD and other metadata file and forward the same to the control unit 460. To delegate segment selection for HAS to the eNB 500, the UE 400 may send a segment request containing a segment selection delegation indicator to the eNB 500 or send a segment selection delegation indicator to the eNB 500 in a different way.

The storage unit 450 may store an MPD or metadata file received by the communication unit 410. The storage unit 450 may temporarily or semi-permanently store media segments received by the communication unit 410. The storage unit 450 may send the control unit 460 a stored media segment to be presented to the user.

The display unit 430 and the audio processing unit 420 may present video content to the user under control of the control unit 460. The control unit 460 controls an operation so that a media segment received by the communication unit 410 is decoded and the video component and the audio component are output respectively to the display unit 430 and the audio processing unit 420. In one embodiment, one of the display unit 430 and the audio processing unit 420 may be omitted. In this case, only visual output may be delivered to the user without sound output, or only sound output may be delivered to the user without visual output.

The input unit 440 may receive user input for content playback, stop, playback position assignment, or playback speed adjustment and forward the same to the control unit 460. The control unit 460 may control the communication unit 410 to send a signal corresponding to the control input to the media providing server 330 and/or the eNB 500.

As described above, the UE 400 may delegate media segment selection to the eNB 500 by sending a segment selection delegation indicator to the eNB 500. In a normal case, the UE 400 may select a media segment and send a URL corresponding to the selected media segment to the media providing server 330. However, according to user control, user settings or usage conditions, the UE 400 may delegate media segment selection to the eNB 500 by sending a segment selection delegation indicator to the eNB 500. The format of the segment selection delegation indicator may be determined in advance according to a standard or other criterion. In one embodiment, the eNB 500 may determine the format or presentation of the segment selection delegation indicator and notify this to the UE 400. Notification of the format or presentation of the segment selection delegation indicator may be performed using a MPD (described later) or higher layer or other notification.

Figure 5:
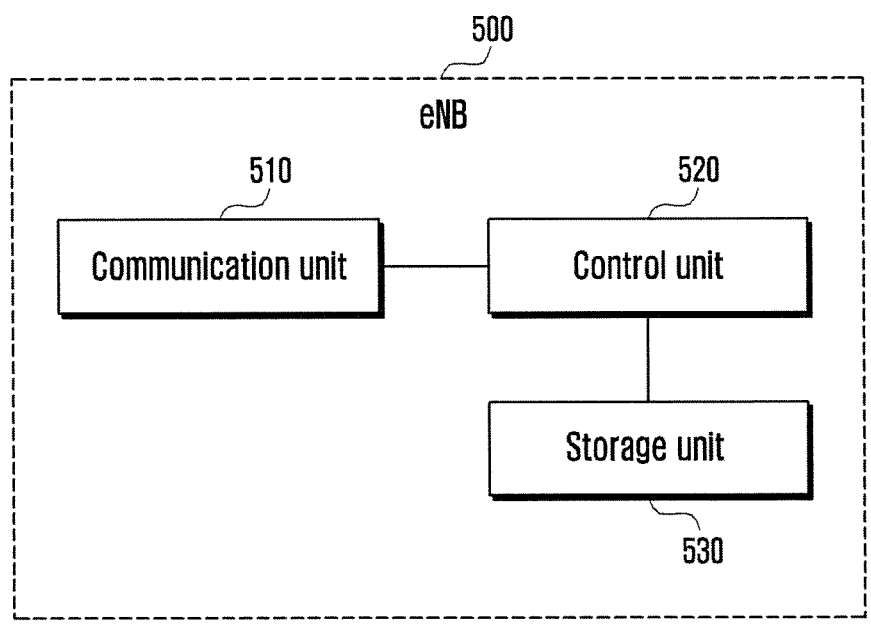
FIG. 5 is a block diagram of a base station 500 according to an embodiment of the present invention.

FIG. 5 is a block diagram of a base station 500 according to an embodiment of the present invention.

Referring to FIG. 5, the eNB 500 may include a communication unit 510, a control unit 520, and a storage unit 530.

The communication unit 510 may receive a media segment from the media providing server 330 and send the media segment to the UE 400. The communication unit 510 may receive a request for a media segment from the UE 400 and send the request to the media providing server 330. The communication unit 510 may receive a metadata file related to an MPD or other segment request from the media providing server 330 and send the metadata file to the UE 400. In one embodiment, the communication unit 510 may send a metadata file to the control unit 520, and the control unit 520 may add a notification of the format or representation of the segment selection delegation indicator to the metadata file and send the metadata file containing the notification to the UE 400. The format or representation of the segment selection delegation indicator may be determined in advance according to a standard or other criterion, and a separate notification thereof may be omitted. In one embodiment, the communication unit 510 may receive a segment request message from the UE 400 and forward the segment request message to the control unit 520, which may then analyze the segment request message. If the segment request message contains a segment selection delegation indicator, the control unit 520 may select a segment for the UE 400, receive the selected segment from the media providing server 330, and deliver the received segment to the UE 400. Segment selection and delivery of a selected segment to the UE 400 are described in detail with reference to FIGS. 8 to 12.

The storage unit 530 may temporarily or semi-permanently store data received from the UE 400, media providing server 330, or other network entity, and provide the data to the control unit 520 if necessary.

The control unit 520 may control the communication unit 510 and the storage unit 530 as described before, and may control the components of the eNB 500 according to the embodiments described later.

Figure 6:
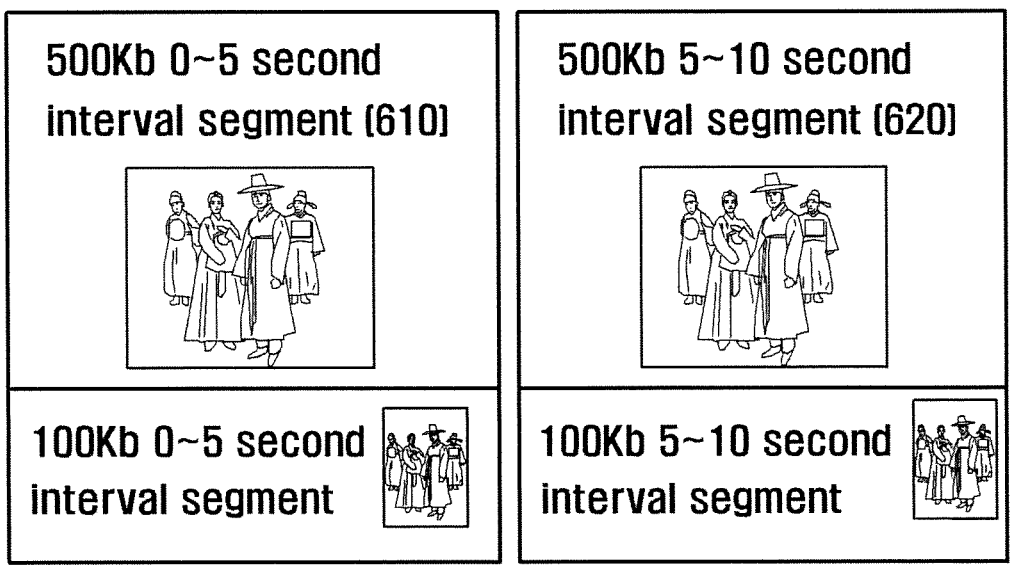
FIG. 6 illustrates video segments stored in a media providing server 330 according to an embodiment of the present invention.

FIG. 6 illustrates video segments stored in the media providing server 330 according to an embodiment of the present invention. All segments 610, 620, 630 and 640 are associated with the same video content. The segments differ in terms of time interval and/or bitrate. The first segment 610 has a bitrate of 500 Kb/s for the time interval from 0 to 5 seconds. The second segment 620 has a bitrate of 500 Kb/s for the time interval from 5 to 10 seconds. The third segment 630 has a bitrate of 100 Kb/s for the time interval from 0 to 5 seconds. The fourth segment 640 has a bitrate of 100 Kb/s for the time interval from 5 to 10 seconds. A unique URL is assigned to each segment. Here, two bitrates (100 Kb/s and 500 Kb/step) and two time intervals (0-5 seconds and 5-10 seconds) are illustrated for brevity of description. However, more than two bitrates and more than two time intervals may be used. These segments may be stored in cache storage of the eNB 500 or stored as other cache entities.

FIG. 7 illustrates a composition of metadata according to an embodiment of the present invention. Metadata as shown in FIG. 7 is provided by the eNB 500 to the UE 400.

The first segment URL 710 corresponds to the first segment 610. The second segment URL 720 corresponds to the second segment 620. The third segment URL 730 corresponds to the third segment 630. The fourth segment URL 740 corresponds to the second segment 640. The UE 400 may use a segment URL to access the corresponding segment. In one embodiment of the present invention, the metadata may further include a URL 700 or 705 corresponding to the segment selection delegation indicator. The format or presentation of such URL 700 or 705 may be created by the eNB 500 and notified to the UE 400 by use of the metadata. The segment selection delegation indicator may be delivered to the UE 400 in a different way other than metadata. The eNB 500 and the UE 400 may share the same format or presentation of the segment selection delegation indicator according to preset rules without separate notification. In an alternative embodiment, although a segment selection delegation indicator is not received, the eNB 500 may select a media segment when a preset condition is satisfied, and receive the selected media segment from the media providing server 330 and forward the received media segment to the UE 400. Realization of the metadata is described later with reference to FIG. 9.

When the UE 400 sends a segment selection delegation indicator to the eNB 500 through notification or in a pre-agreed manner, the eNB 500 may select a media segment (or video segment), receive the selected media segment from the media providing server 330, and send the received media segment to the UE 400 according to the embodiments described later with reference to FIGS. 8 to 12.

Figure 8:
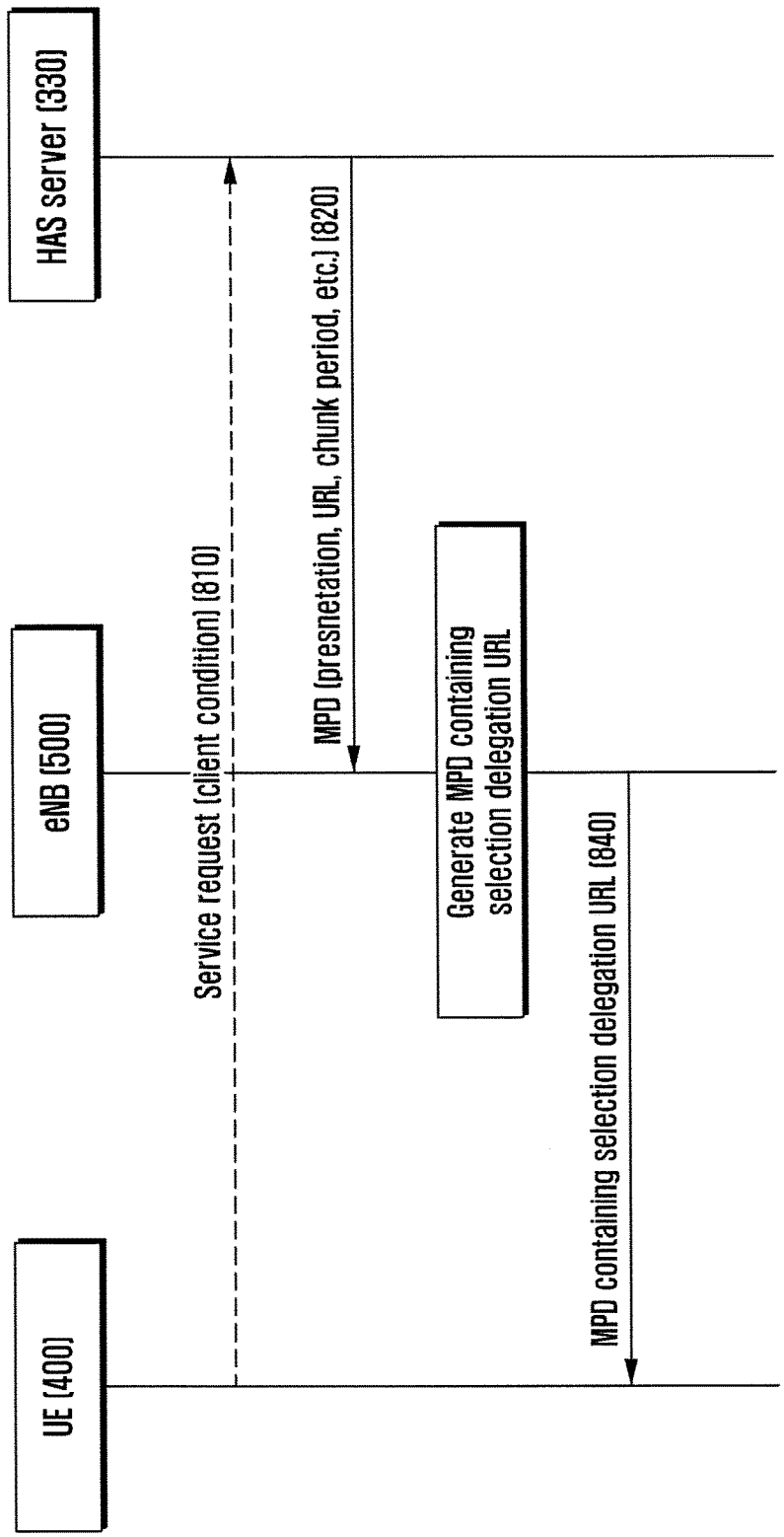
FIG. 8 is a sequence diagram of an initialization procedure for media transmission and reception according to a first embodiment of the present invention.

FIG. 8 is a sequence diagram of an initialization procedure for media transmission and reception according to a first embodiment of the present invention. The procedure of FIG. 8 may be omitted when the eNB 500 delivers the format or presentation of the segment selection delegation indicator in a different way or the eNB 500 and the eNB 500 share the same format or presentation of the segment selection delegation indicator in advance without separate notification. When the eNB 500 satisfies a different condition regardless of a segment selection delegation indicator, the procedure of FIG. 8 may be omitted in a segment selection embodiment.

At step 810, the UE 400 sends a service request for a video (or audio) to the media providing server, i.e. the HAS server 330. Here, only a video service is described. However, other types of media may be handled in a similar way. The service request may include a client condition. The client condition may include information regarding a codec and screen size (resolution) supported by the UE 400, and other information needed for video/audio services for the UE 400. In one embodiment, the eNB 500 may save the client condition contained in a received service request and use the saved client condition for segment selection described in FIGS. 10 and 11.

At step 820, the HAS server 330 sends metadata, e.g. MPD, to the UE 400. The MPD includes information on a video segment matching the client condition among video segments for the corresponding video content maintained by the HAS server 330. The MPD may include the presentation and chunk period of a video segment, and a URL corresponding to the presentation and chunk period. That is, the UE 400 may use a URL to access a video segment corresponding to the presentation and chunk period associated with the URL. Here, the presentation of a video segment may include information regarding the bitrate, codec or resolution, and one or more parameters influencing video quality. The chunk period indicates the time interval (i.e. playback position) of the corresponding video segment.

At step 830, the eNB 500 generates a new MPD by adding the format (i.e. URL) of the segment selection delegation indicator to the received MPD. It may be viewed that the eNB 500 modifies the received MPD to generate a new MPD. At step 840, the eNB 500 sends the new MPD to the UE 400. The UE 400 may analyze the received MPD and save the URL of the segment selection delegation indicator in particular.

Figure 9:
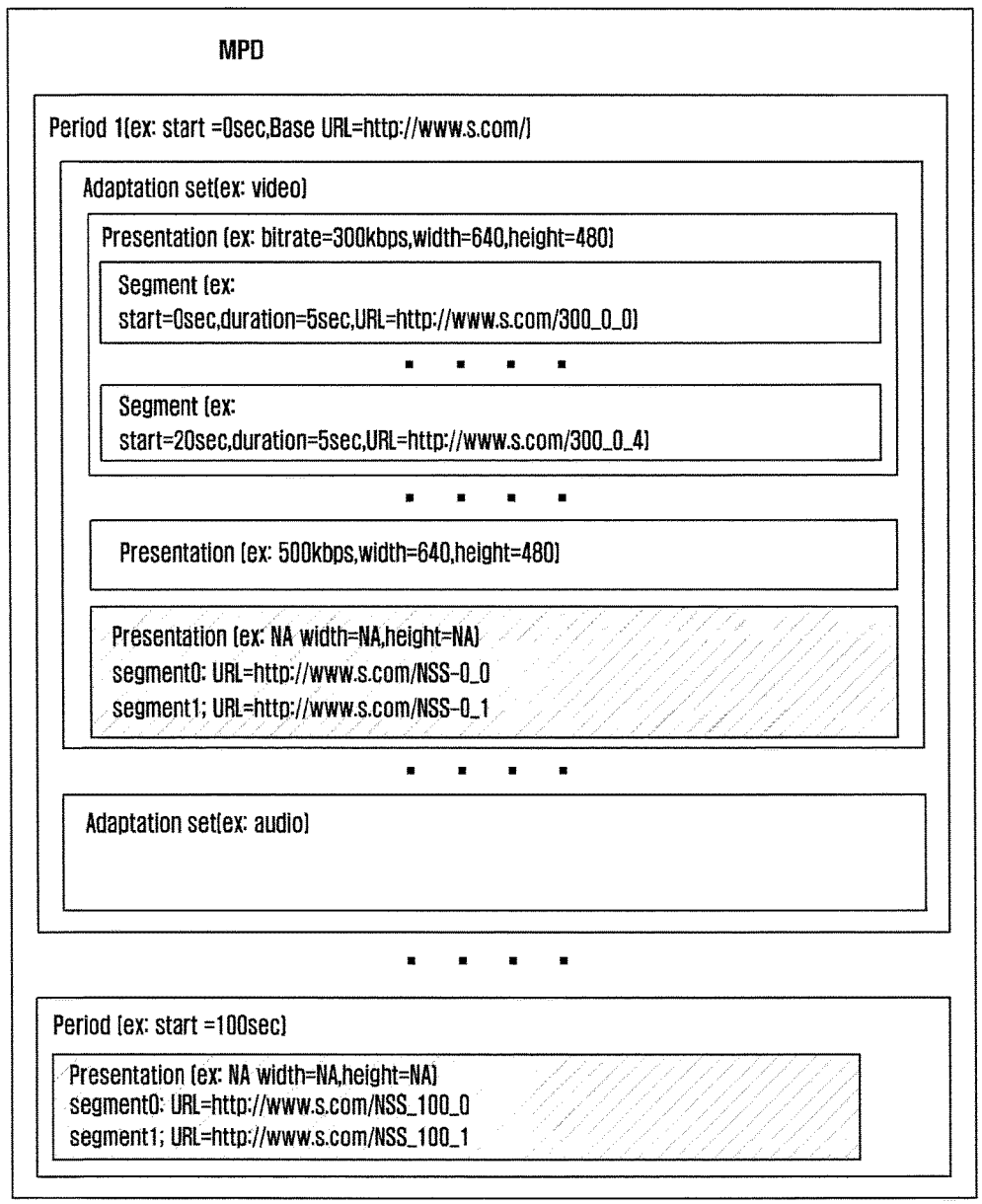
FIG. 9 illustrates a structure of an MPD according to an embodiment of the present invention.

FIG. 9 illustrates a structure of an MPD according to an embodiment of the present invention.

In FIG. 9, the URL acting as a segment selection delegation indicator is added to the MPD.

A URL acting as a segment selection delegation indicator may take a form of "http://www.s.com/NSS-0_0", "http://www.s.com/NSS-0_1", "http://www.s.com/NSS-100_0", "http://www.s.com/NSS-100_1" or the like. For example, "http://www.s.com/NSS-0_0" and "http://www.s.com/NSS-0_1" indicates that segment selection for the $0^{th}$ and $1^{st}$ time intervals from the start position of 0 second is delegated to the eNB. When a video request message containing "http://www.s.com/NSS-0_0" is received from the UE 400, the eNB 500 may select a segment matching the current network condition or the like from among the segments for the 0th time interval from the start position of 0 second and send the selected segment to the UE 400. When a video request message containing "http://www.s.com/NSS-100_1" is received from the UE 400, the eNB 500 may select a segment matching the current network condition or the like from among the segments for the $1^{st}$ time interval from the start position of 100 seconds and send the selected segment to the UE 400. To indicate that a URL is a segment selection delegation indicator in the MPD, "N/A", "NA" or other agreed mark may be placed in a presentation field corresponding to the URL.

The location of the MPD at which a URL acting as a segment selection delegation indicator is contained may differ from embodiment to embodiment. A URL acting as a segment selection delegation indicator may also be included in non-MPD metadata with suitable modification.

Figure 10:
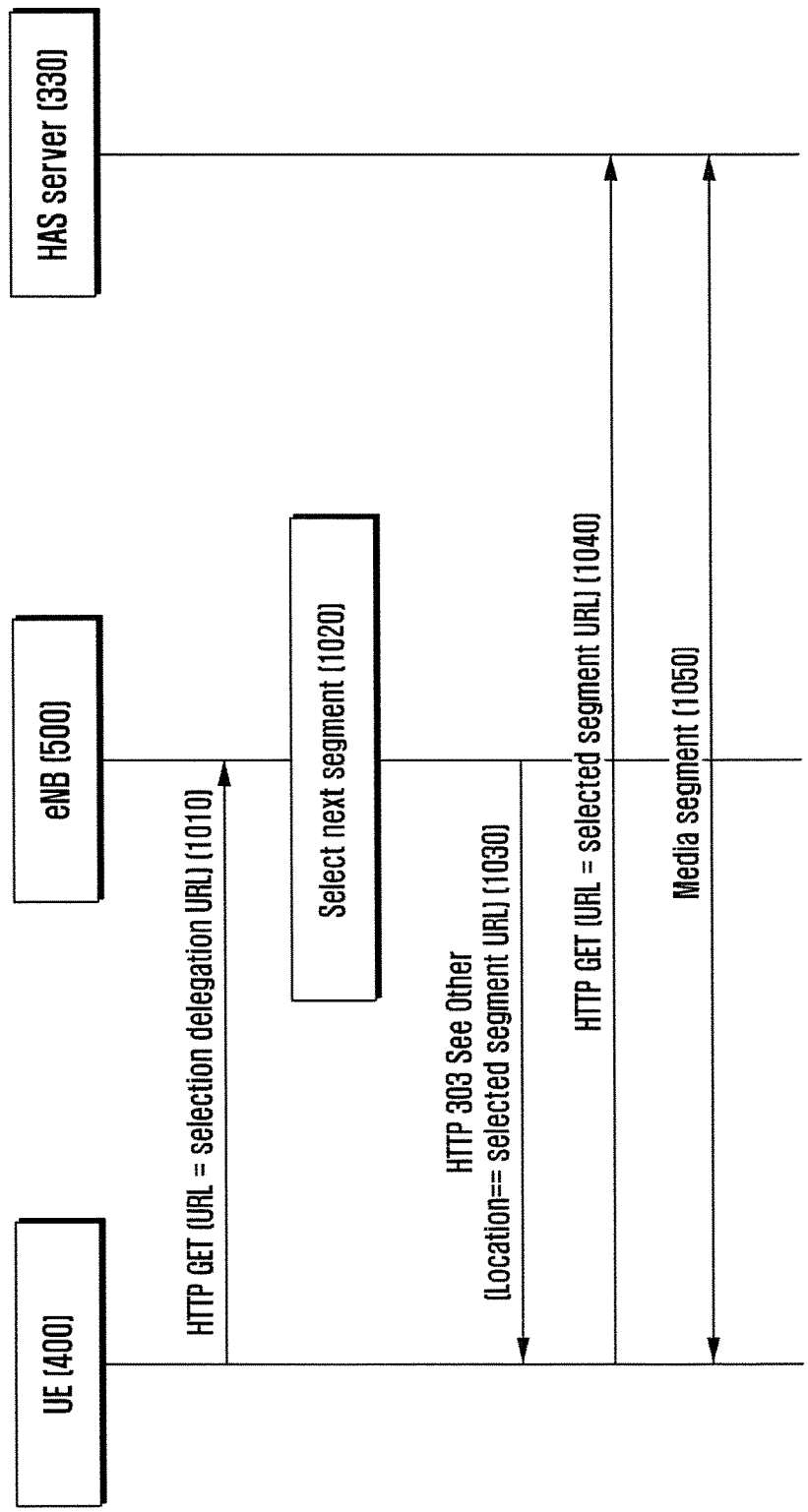
FIG. 10 is a sequence diagram of a procedure for media transmission and reception according to the first embodiment of the present invention.

FIG. 10 is a sequence diagram of a procedure for media transmission and reception according to the first embodiment of the present invention. The procedure of FIG. 10 is carried out after the initialization procedure of FIG. 8.

At step 1010, the UE 400 sends an HTTP GET message indicating segment selection delegation to the eNB 500. Here, the GET message includes a URL acting as a segment selection delegation indicator notified through the procedure of FIG. 8. The UE 400 may delegate segment selection to the eNB 500 instead of directly performing segment selection when a preset condition is satisfied according to media player settings, UE base settings, or explicit user requests. The UE 400 may use an HTTP GET message to make a delegation request. The URL field of the HTTP GET message may contain a URL acting as a segment selection delegation indicator notified in the form of MPD shown in FIG. 9. In another embodiment, according to a pre-agreement without separate notification, the eNB 500 and UE 400 may share the same URL acting as a segment selection delegation indicator.

For direct segment selection, the UE 400 may send an HTTP GET message containing a URL corresponding to a different presentation notified via an MPD to the HAS server 330 and receive a corresponding video segment from the HAS server 330. This is identical or similar to existing schemes, and a detailed description thereof is omitted.

At step 1020, the eNB 500 analyzes the received HTTP GET message. If the URL of the received HTTP GET message is a URL acting as a segment selection delegation indicator, the eNB 500 directly selects a segment. If the URL of the received HTTP GET message is not a URL acting as a segment selection delegation indicator, the eNB 500 forwards the HTTP GET message to the HAS server 330 according to an existing scheme.

Figure 11:
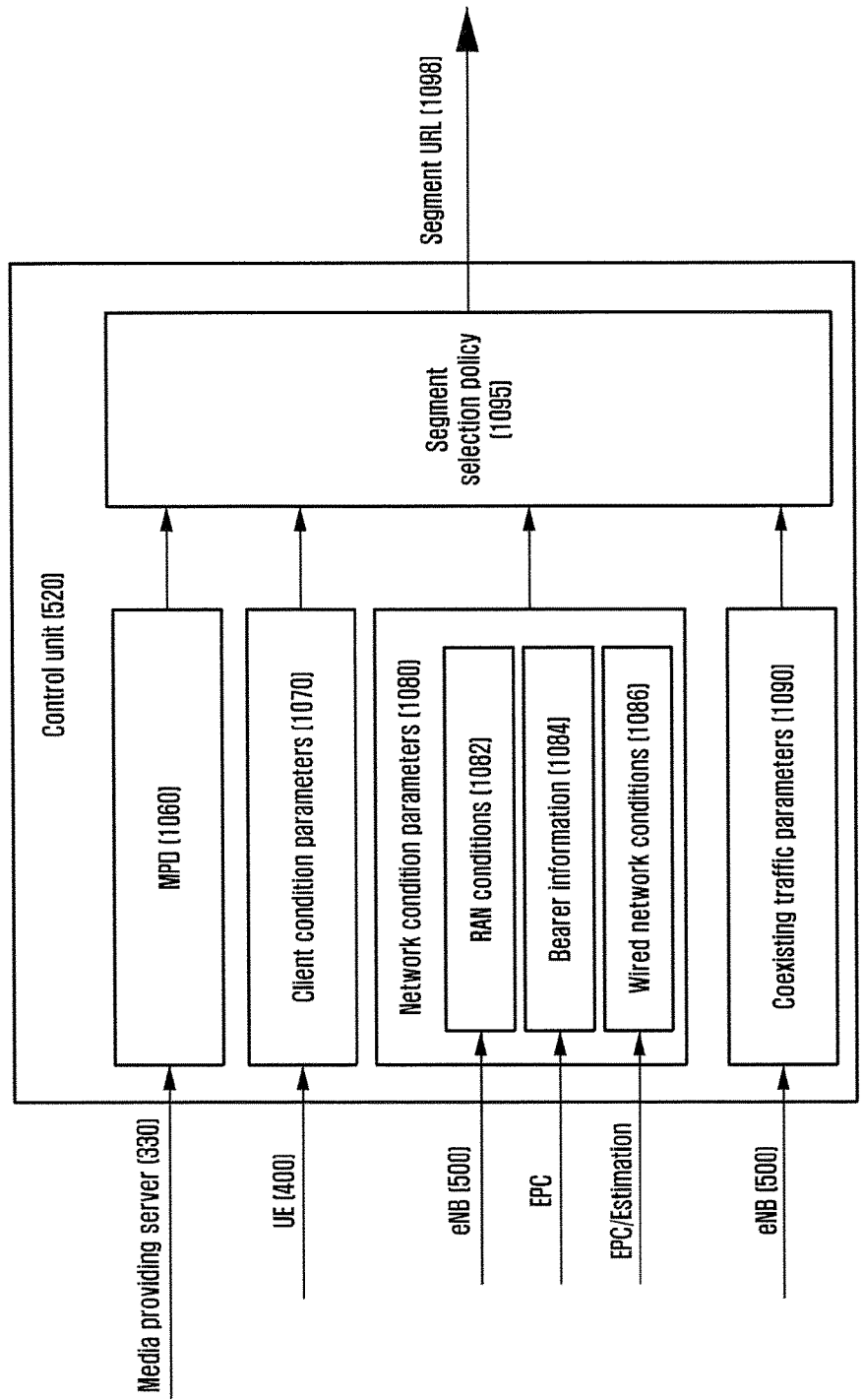
FIG. 11 depicts segment selection by the base station 500 according to an embodiment of the present invention.

FIG. 11 depicts segment selection by the base station 500 according to an embodiment of the present invention.

The control unit 520 of the eNB 500 may select a segment according to a preset segment selection policy 1095. The segment selection policy 1095 may consider one or more of network condition parameters 1080, client condition parameters 1070, and coexisting traffic parameters 1090. As the actual segment URL is specified in the MPD 1060, the control unit 520 has to use the MPD 1060 or a different type metadata file. According to embodiments, some or all of the network condition parameters 1080, client condition parameters 1070, and coexisting traffic parameters 1090 may be used for segment selection.

The control unit 520 may receive an MPD 1060 from the media providing server 330 and store the same in the storage unit 530 according to the embodiment of FIG. 8. The storage unit 530 may store an MPD received from the media providing server 330 without modification or an MPD newly generated by the control unit 520. The storage unit 530 may store only a portion of the received MPD necessary for segment selection or the whole of the received MPD in a modified form. As the control unit 520 modifies only the newly added field for the segment selection delegation indicator in the MPD, any version of the MPD may be used in the present invention. The control unit 520 may select a suitable segment from among candidate segments contained in the MPD 1060 according to the segment selection policy 1095. The MPD 1060 may include information regarding a presentation (quality, resolution, bitrate or the like) of a segment, a time interval, and a URL of the segment for the time interval. The MPD 1060 may further include information regarding quality rankings of corresponding video segments.

The segment selection policy 1095 may consider, for example, the client condition parameters 1070. The client condition parameters 1080 may include one or more of user control commands and screen size. The user control commands may include "play", "stop", "pause", "fast forward" and "rewind". The UE 400 may send information on user control commands to the HAS server 330 and/or the eNB 500 in a pre-agreed form. Upon reception of information on a control command, the eNB 500 may perform segment selection in consideration of the control command. The eNB 500 may obtain information on the screen size (resolution) of the UE 400 during the procedure of FIG. 8.

The segment selection policy 1095 may consider, for example, the network condition parameters 1080. The network condition parameters 1080 may include one or more of radio access network (RAN) conditions 1082, bearer information 1084, and wired network conditions 1086.

The RAN conditions 1082 include information on states of radio channels between the eNB 500 and the UE 400. The RAN conditions 1082 may include the signal-to-noise ratio (SNR), signal-to-interference-and-noise ratio (SINR), and other similar indexes. The RAN conditions 1082 may further include the physical layer transmission rate or the downlink buffer level of the eNB 500. The physical layer transmission rate may be related to the modulation and coding scheme (MCS) for the downlink from the eNB 500 to the UE 400. The control unit 520 may receive information on the RAN conditions 1082 obtained by the communication unit 510 or other component of the eNB 500 through measurement.

The bearer information 1084 includes configuration information of the bearer used for HAS traffic of the UE 400. For example, the bearer information 1084 may include one or more of bearer QoS (Quality of Service) parameters, such as Quality Class Identifier (QCI), Maximum Bit Rate (MBR), and Available Bit Rate (ABR). The eNB 500 may obtain the bearer information 1084 from the Evolved Packet Core (EPC).

The wired network conditions 1086 may include information regarding throughput and delay between the HAS server 330 and the eNB 500 and other wired network states. The control unit 520 may obtain information on the wired network conditions 1086 through measurement performed by the communication unit 510 or information received from the EPC.

The coexisting traffic parameters 1090 may include information regarding traffic of other UEs passing through the eNB 500 (downlink traffic in particular). For example, the coexisting traffic parameters 1090 may include information on at least one of non-HAS service throughput of the eNB 500, HAS segments selected by other UEs, and HAS quality rankings of other UEs.

Referring back to FIG. 10, at step 1020, the control unit 520 selects the next segment on the basis of the conditions and/or parameters described above. The control unit 520 may select a segment according to the segment selection policy 1095. The control unit 520 may analyze the URL acting as a segment selection delegation indicator sent by the UE 400 to identify the time interval of the segment requested by the UE 400. As described above, as a URL acting as a segment selection delegation indicator is assigned for each time interval, the UE 400 may notify the eNB 500 of the time interval of a requested segment through such URL. In a different embodiment, the UE 400 may notify the eNB 500 of the time interval of a requested segment through a separate message not containing a URL. In another embodiment, the UE 400 may receive segments in sequence from the first time interval without separate notification of the time interval.

The control unit 520 may select a segment matching other environmental conditions from among segments for the requested time interval.

For example, when the wired network conditions 1086 are poor and the RAN conditions 1082 are acceptable, the control unit 520 may select a segment with relatively poor quality according to the wired network conditions 1086. The control unit 520 may select a segment according to the worst condition (i.e. bottleneck condition) among conditions considered in the segment selection policy 1095. When the coexisting traffic parameters 1090 indicate a poor state in the eNB 500 (i.e. the eNB 500 is heavily loaded with traffic caused by other UEs) while other conditions or parameters are acceptable, the control unit 520 may select a segment with relatively poor quality. The control unit 520 may select a segment in such a manner that the overall quality of the HAS traffic flows passing through the eNB 500 is maximized in consideration of quality rankings of the coexisting traffic flows. For example, when the traffic flow of a first UE carries a motionless scene and the traffic flow of a second UE carries an important action scene filled with motion, the control unit 520 may select a segment with a low bitrate for the first UE and select a segment with a high bitrate for the second UE. When the video content requested by the UE 400 is already being served to a different UE, the control unit 520 may provide a segment that is delivered to the different UE to the UE 400 as a form of reuse. This policy may be utilized only when the play positions of the two UEs are close sufficiently for reuse and the eNB 500 has a sufficiently large storage space.

The segment selection policy may be designed so as to avoid congestion and ensure service fairness between UEs. To reduce the response time, the eNB 500 may store frequently requested video contents in a cache. The eNB 500 may utilize an external cache server storing video contents.

In a variant embodiment, for a video requested by the UE 400, the eNB 500 may pre-store segments having different bitrates for a time interval to be played, selects a suitable segment from the pre-stored segments in accordance with the client condition parameters 1070 and the RAN conditions 1082, and provide the selected segment to the UE 400. Here, the unselected segments should be deleted in a proper way.

At step 1030, the eNB 500 sends an HTTP 303 message or redirection message containing a URL of the selected segment to the UE 400. Upon reception of the redirection message, at step 1040, the UE 400 sends an HTTP GET message (i.e. segment request message), containing the segment URL contained in the redirection message to the HAS server 330. Here, the eNB 500 may analyze the segment request message sent at step 1040. However, as the segment request message does not contain a segment selection delegation indicator, the eNB 500 forwards the segment request message without modification to the HAS server 330. At step 1050, the HAS server 330 sends a video segment corresponding to the received segment URL to the UE 400. The UE 400 processes the received segment and provides the processed segment to the user. That is, the UE 400 decodes the received segment, and displays the visual component on the screen and outputs the audio component to the speaker or headset port.

In a variant embodiment, instead of sending a redirect message to the UE 400 at step 1030, the eNB 500 may create a new HTTP GET message by modifying the received HTTP GET message so as to contain the URL of the selected segment and send the new HTTP GET message to the HAS server 330. In this case, the eNB 500 may receive a segment from the HAS server 330 and forward the received segment to the UE 400.

When it becomes unnecessary to send received video segments to the UE 400 according to user control input (for example, a control command such as "fast forward", "rewind" or "pause") during execution of the procedure of FIG. 10, the eNB 500 may delete the unnecessary video segments. In other words, for a newly received video segment request message (HTTP GET message), unsent video segments whose time interval does not immediately follow the time interval indicated by the URL acting as a segment selection delegation indicator of the last HTTP GET message may be deleted as unnecessary segments. In addition, the eNB 500 sends the UE 400 a segment corresponding to the time interval indicated by the URL acting as a segment selection delegation indicator contained in the newly received HTTP GET message. When such a segment is not preset, the eNB 500 may re-select a segment for the time interval indicated by the URL acting as a segment selection delegation indicator contained in the newly received HTTP GET message, receive the segment, and forward the same to the UE 400.

Figure 12:
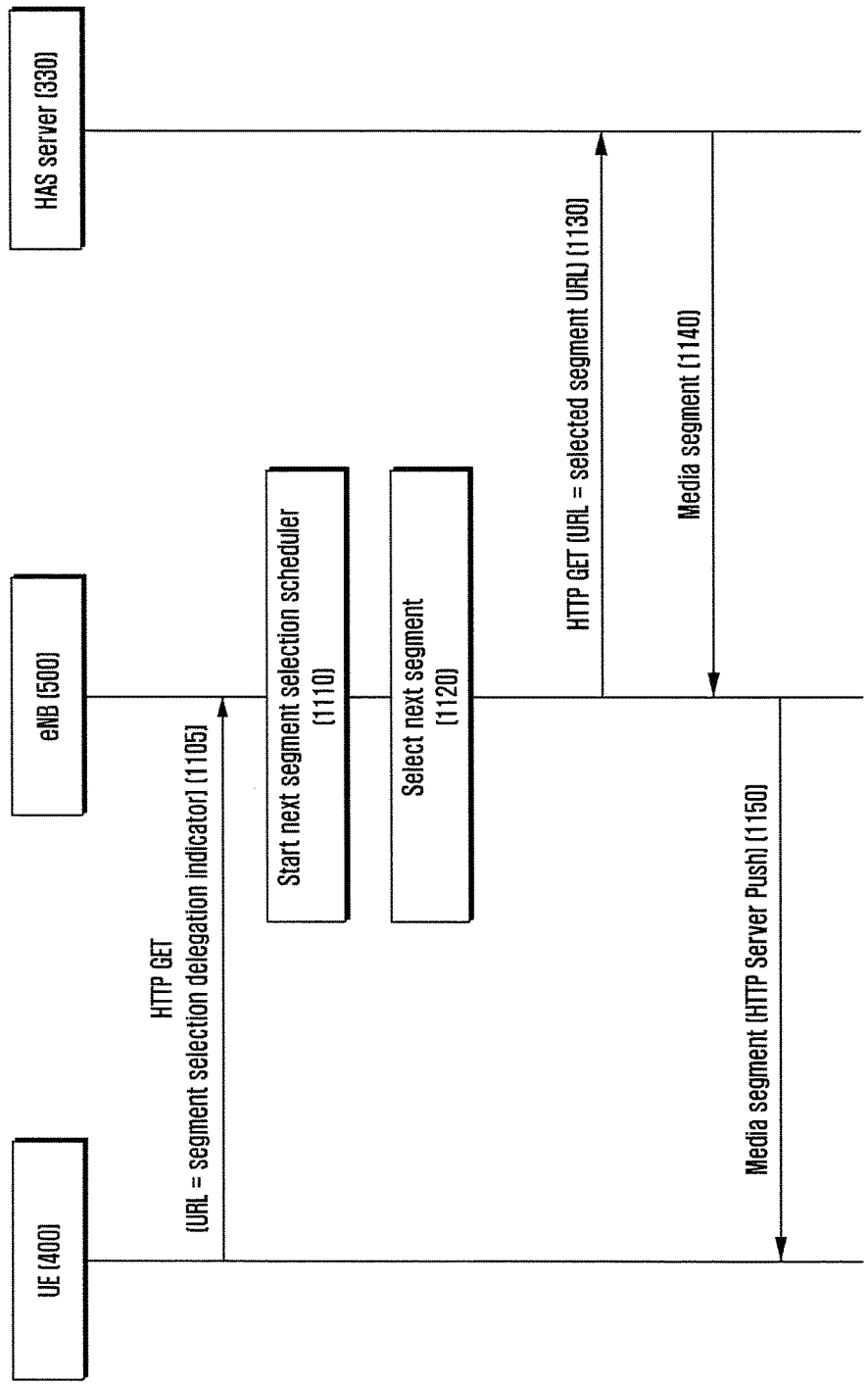
FIG. 12 is a sequence diagram of a procedure for media segment transmission and reception according to a second embodiment of the present invention.

FIG. 12 is a sequence diagram of a procedure for media segment transmission and reception according to a second embodiment of the present invention.

At step 1105, the UE 400 notifies the eNB 500 of segment selection delegation by use of an HTTP GET message. Here, the GET message includes a URL acting as a segment selection delegation indicator notified through the procedure of FIG. 8. The UE 400 may delegate segment selection to the eNB 500 instead of directly performing segment selection when a preset condition is satisfied according to media player settings, UE base settings, or explicit user requests. The UE 400 may use an HTTP GET message to make a delegation request. The URL field of the HTTP GET message may contain a URL acting as a segment selection delegation indicator notified in the form of MPD shown in FIG. 9. In another embodiment, according to a pre-agreement without separate notification, the eNB 500 and UE 400 may share the same URL acting as a segment selection delegation indicator. In another embodiment, the UE 400 may notify the eNB 500 of segment selection delegation by use of a means other than an HTTP GET message.

For direct segment selection, the UE 400 may send an HTTP GET message containing a URL corresponding to a different presentation notified via an MPD to the HAS server 330 and receive a corresponding video segment from the HAS server 330. This is identical or similar to existing schemes, and a detailed description thereof is omitted.

At step 1110, the eNB 500 analyzes the received HTTP GET message. If the URL of the received HTTP GET message is a URL acting as a segment selection delegation indicator, the eNB 500 starts a segment selection scheduler to directly select a segment. When the segment selection scheduler is started, the eNB 500 repeats steps 1120 to 1150 on a cycle enabling the UE 400 to smoothly receive video content. The UE 400 does not have to send an additional request after initially sending the segment selection delegation indicator (step 1105). Thereby, the UE 400 may reduce usage of radio resources needed to send a segment request message. The eNB 500 may automatically repeat the following steps so that the user of the UE 400 may smoothly receive video/audio content.

If the URL of the received HTTP GET message is not a URL acting as a segment selection delegation indicator, the eNB 500 forwards the HTTP GET message to the HAS server 330 according to an existing scheme.

At step 1120, when the next cycle for segment selection is reached, the eNB 500 selects the next segment by use of a scheme described in connection with the first embodiment. Here, the time interval for the segment may be determined according to the segment selection delegation indicator sent by the UE 400. Arrival of the segment selection cycle may be detected by the segment selection scheduler. When the number of segments prepared for transmission to the UE 400 is less than or equal to a preset quantity, the eNB 500 may determine that the segment selection cycle is reached. Instead of making one request for segments corresponding to one time interval per cycle, the eNB 500 may make a request for segments corresponding to two or more consecutive time intervals per cycle. In this case, multiple segments are selected. When segments for multiple time intervals are selected and requested, the segment selection cycle may be lengthened to a certain extent. In addition, when the wired network conditions are acceptable and the RAN conditions are erratic, the eNB 500 may request and maintain all versions of the segment for the same time interval. In this case, the eNB 500 may select a suitable segment from among the maintained segments in consideration of the client conditions or RAN conditions, and provide the suitable segment to the UE 400.

At step 1130, the eNB 500 sends an HTTP GET message (i.e. segment request message) containing a URL of the selected segment to the UE 400. The eNB 500 may not only request a segment for the current play position but also request segments for the following play positions in advance. After making a segment request one or more times, the eNB 500 makes a request for the segment following the previously requested and received segment.

At step 1140, the HAS server 330 sends a video segment corresponding to the segment URL to the eNB 500. At step 1150, the eNB 500 sends the video segment to the UE 400 via HTTP server push.

When it becomes unnecessary to send received video segments to the UE 400 according to user control input (for example, a control command such as "fast forward", "rewind" or "pause"), the eNB 500 may delete the unnecessary video segments. In the event that some segments are pre-stored in the eNB 500 as a result of repeating steps 1120 to 1150, when a segment request message indicating play position change or end-of-playback is received from the UE 400, the eNB 500 may delete unnecessary ones of video segments not sent yet.

The procedure of FIG. 12 may be used together with the procedure of FIG. 10. That is, when a segment selection delegation indicator is received from the UE 400, the eNB 500 may select a video segment and send the URL of the selected video segment to the UE 400. In this case, two or more segment selection delegation indicators are used for the same time interval and presentation (quality and bitrate). One of the two segment selection delegation indicators may be used to direct processing according to the procedure of FIG. 10 and the other is used to direct processing according to the procedure of FIG. 12. On the other hand, the procedure of FIG. 12 may be used in an independent way. That is, only the procedure of FIG. 12 may be processed with exclusion of the procedure of FIG. 10

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

The user equipment or terminal of the present invention may be one of portable electronic devices including a mobile phone, Personal Digital Assistant (PDA), navigation aid, digital broadcast receiver, and Portable Multimedia Player (PMP).

The above description is provided to assist in a comprehensive understanding of various embodiments of the present invention. It includes various specific details to assist in that understanding but these are to be regarded as merely exemplary. Accordingly, those of ordinary skill in the art will recognize that various changes and modifications of the embodiments described herein can be made without departing from the scope and spirit of the present invention.

Exemplary embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method to transmit and receive media segments by a base station, the method comprising:
receiving a segment request message from a user equipment;
identifying whether the segment request message contains a segment selection delegation indicator for delegating a segment selection to the base station, the segment selection delegation indicator being associated with a start position for segment selection;
selecting a segment among two or more segments located after the start position, based on a network condition; and
transmitting a uniform/universal resource locator (URL) of the selected segment to the user equipment.

2. The method of claim 1, further comprising transmitting a modified segment request message containing the URL of the selected segment to an external server after selecting the segment.

3. The method of claim 2, further comprising receiving the selected segment from an external server to deliver the received segment to the user equipment.

4. The method of claim 3, further comprising:

transmitting the received segment to the user equipment via a hypertext transfer protocol (HTTP) server push; and repeating the selection of the one or more segments, the transmitting of the modified segment request message, the receiving of the segment, and the transmitting of the received segment according to a preset cycle.

5. A base station (BS) configured to transmit and receive media segments, the BS comprising:

a communication unit configured to transmit and receive signals; and a control unit configured to:

control the communication unit to receive a segment request message from a user equipment, identify whether the segment request message contains a segment selection delegation indicator for delegating a segment selection to the BS, the segment selection delegation indicator being associated with a start position for segment selection, select a segment among two or more segments located after the start position, based on a network condition, and control the communication unit to transmit a uniform/universal resource locator (URL) of the selected segment to the user equipment.

6. The BS of claim 5, wherein the control unit is further configured to control the communication unit to transmit a modified segment request message containing the URL of the selected segment to an external server after selecting the segment.

7. The BS of claim 6, wherein the control unit is further configured to control the communication unit to receive the selected segment from an external server to deliver the received segment to the user equipment.

8. The BS of claim 7, wherein the control unit is further configured to control the communication unit to transmit the received segment to the user equipment via a hypertext transfer protocol (HTTP) server push, wherein the control unit is further configured to repeat the selection of the one or more segments according to a present cycle, and wherein the communication unit is controlled to repeat the transmitting of the modified segment request message, the receiving of the segment, and the transmitting of the received segment according to a preset cycle.

9. A method to receive media by a user equipment, the method comprising:

transmitting, in case that the user equipment is configured to delegate segment selection to a base station, a segment request message containing a segment selection delegation indicator to the base station, the segment selection delegation indicator being associated with a start position for segment selection; and receiving a uniform/universal resource locator (URL) of a segment selected, by the base station, among two or more segments located after the start position from the base station.

10. The method of claim 9, further comprising outputting a media corresponding to the selected segment based on the URL.

11. A user equipment (UE) capable of receiving media, comprising:

a communication unit configured to transmit and receive signals; and a control unit configured to:

control the communication unit to transmit, in case that the UE is configured to delegate segment selection to a base station, a segment request message containing a segment selection delegation indicator to the base station, the segment selection delegation indicator being associated with a start position for segment selection, and control the communication unit to receive a uniform/universal resource locator (URL) of a segment selected, by the base station, among two or more segments located after the start position from the base station.

12. The UE of claim 11, wherein the control unit is further configured to output a media corresponding to the selected segment based on the URL.

\* \* \* \* \*